United States Patent
Quackenbush et al.

(10) Patent No.: US 6,181,708 B1
(45) Date of Patent: Jan. 30, 2001

(54) LOSSLESS ARBITRATION SCHEME AND NETWORK ARCHITECTURE FOR COLLISION BASED NETWORK PROTOCOLS

(75) Inventors: William L. Quackenbush; Hon Wah Chin, both of Palo Alto; Roland G. Chan, Mountain View, all of CA (US)

(73) Assignee: Cisco Technology, Inc., San Jose, CA (US)

(*) Notice: Under 35 U.S.C. 154(b), the term of this patent shall be extended for 0 days.

(21) Appl. No.: 09/000,731

(22) Filed: Dec. 30, 1997

(51) Int. Cl.[7] ................................. H04L 12/413
(52) U.S. Cl. ........................... 370/445; 370/448
(58) Field of Search .................... 370/445, 446, 370/447, 448, 449, 450, 451, 444, 461, 276, 279, 293, 462, 501, 503, 229, 236

(56) References Cited

U.S. PATENT DOCUMENTS

| | | |
|---|---|---|
| 4,769,810 | 9/1988 | Eckberg, Jr. et al. ............ 370/232 |
| 4,769,811 | 9/1988 | Eckberg, Jr. et al. ............ 370/236 |
| 5,381,413 * | 1/1995 | Tobagi et al. .................... 370/448 |
| 5,430,726 * | 7/1995 | Moorwood et al. .............. 370/438 |
| 5,912,895 * | 6/1999 | Terry et al. ...................... 370/445 |
| 5,940,399 * | 8/1999 | Weizman ......................... 370/445 |
| 5,978,383 * | 11/1999 | Molle ............................... 370/445 |

* cited by examiner

Primary Examiner—Ajit Patel
Assistant Examiner—Brian Nguyen
(74) Attorney, Agent, or Firm—Marger Johnson & McCollom, P.C.

(57) ABSTRACT

A lossless arbitration scheme combines IEEE 802.3 compliant Medium Access Controllers (MACs) with a centralized arbiter and out of band access control signaling to achieve a spatially confined LAN that looks to attached devices like an IEEE 802.3 LAN, but has no bandwidth loss due to collisions, no excessive collisions and greater short term access fairness than standard Carrier Sense Multiple Access with Collision Detection (CSMA/CD) LANs. Two such spatially confined LANs are combined with an IEEE 802.3 compatible full-duplex point to point link to provide communication between two spatially confined groups of devices without bridges and buffering even when the separation of the groups is not spatially confined.

20 Claims, 7 Drawing Sheets

LOSSLESS ARBITRATION SCHEME AND NETWORK ARCHITECTURE FOR COLLISION BASED NETWORK PROTOCOLS

BACKGROUND OF THE INVENTION

This invention relates to a network architecture that provides improved aggregation of multiple network devices and a lossless arbitration scheme for Carrier Sense Multiple Access/Collision Detect (CSMA/CD) based Local Area Network (LAN) protocols that has increased bandwidth along with predictable network access.

A device wanting to transmit on a CSMA/CD LAN, such as Institute of Electrical and Electronic Engineers (IEEE) 802.3, first listens to the medium. If the medium is idle, the device begins transmitting immediately. If the medium is not idle, the device waits until the medium becomes idle and remains idle for a defined period of time before beginning transmission. If two or more devices begin transmitting at about the same time, their transmissions collide. The collision is detected and all colliding devices terminate their transmission and wait a random period of time (back off) before attempting to transmit again. Devices attempt repeatedly to transmit each packet until they are either successful or they collide a specified number of times in which case they discard the packet.

The range of times from which the back off time is randomly selected increases after each collision. For example, after a first collision, a device waits either zero or one slot times (an interval of time defined in the 802.3 protocol). After a second collision, the device waits anywhere between zero to three slot times, and so on, up to 1023 slot times.

The protocol has several disadvantages. Bandwidth is wasted each time transmissions collide. Transmission is unreliable as packets that experience an excessive number of collisions ale discarded. Access to the medium can also be quite unfair over short periods of time. Short term access unfairness is the result of the back off algorithm. When the demand for use of the LAN is high and two or more devices collide, the first of the colliding devices to successfully transmit on the medium has an advantage over the other devices in the collision group as the range of times from which the back off time is randomly selected is reset to the minimum each time a device successfully transmits on the medium.

The physical extent of a CSMA/CD LAN is limited by the minimum transmission duration to send a packet. Collisions result in shorter than normal duration transmissions which are called transmission fragments. Transmission fragments are recognized and rejected based on their short duration. The physical extent of a CSMA/CD LAN is limited by the requirement that the propagation delay between any two devices attached to the LAN must be somewhat less than half of the minimum transmission time for a packet.

Connecting devices whose electrical separation is greater than that allowed by a CSMA/CD LAN requires switching and buffering. Such devices are connected to different LANs and the LANs are interconnected with switches which provide the necessary buffering. The switch and packet buffering is complex and expensive to implement.

Accordingly, a need remains for a network architecture and arbitration scheme for CSMA/CD LAN protocols that does not waste bandwidth, is more reliable, provides predictable access and allows devices with greater physical separation to be connected to the same LAN.

SUMMARY OF THE INVENTION

IEEE 802.3 compliant Media Access Controllers (MACs) are combined with a centralized repeater (commonly called a hub) with arbitration and out of band signaling to achieve a lossless LAN that looks like an IEEE 802.3 LAN to attached devices, but has no bandwidth loss due to collisions, no discarded packets due to excessive collisions, predictable access and no short term unfairness.

The lossless network according to the invention includes a hub having multiple inputs that are coupled to individual devices by separate transmit links and outputs that are coupled to the individual devices by either a common or separate receive links. An arbiter controls the hub and forces colliding devices to transmit in a prioritized sequential order. Repeated back offs are eliminated because devices are prevented from colliding more than one time for each packet that the device transmits.

After a collision on a CSMA/CD LAN, a collision signal is asserted to the MACs causing all transmitting devices to back off for 0 to N slot times where N is 1 for the first collision. After they back off, the colliding devices retransmit only when their carrier sense signal is deasserted. The arbiter in the present invention uses out of band signaling to individually control a collision indication signal and a carrier sense signal to each device. The collision indication signal is hidden to the colliding device with the highest priority. Thus, that one device is allowed to continue to transmit. However, the collision indication signal is asserted to other colliding devices causing the other devices to back off. The devices forced to back off will not retransmit until their carrier sense signal is deasserted via the out of band signaling. All devices that are not pall of collision group also have their carrier sense signal asserted. After a device finishes transmitting, its carrier sense signal remains asserted so it does not try to transmit again.

The arbiter deasserts the carrier sense signal to the remaining colliding devices one at a time according to a priority scheme. When the carrier sense signal is deasserted to a device, that device retransmits without the possibility of colliding with other devices. Thus, the devices are allowed to transmit in a fairer and predictable manner. Usable bus bandwidth is also increased because collisions do not cause all devices to stop transmitting.

Two of the lossless networks according to another embodiment of the invention are combined with a full-duplex 802.3 link, two additional IEEE 802.3 receive links and a second MAC on each device to form a network interconnecting two groups of devices in which the physical extent of each group, but not the physical separation of the groups, is limited by the CSMA/CD protocol. The resulting network has the lossless and fairness properties of the lossless networks. And because of the unique architecture, switching and buffering are not required.

The foregoing and other objects, features and advantages of the invention will become more readily apparent from the following detailed description of a preferred embodiment of the invention which proceeds with reference to the accompanying drawings.

DETAILED DESCRIPTION

Figure 1B:
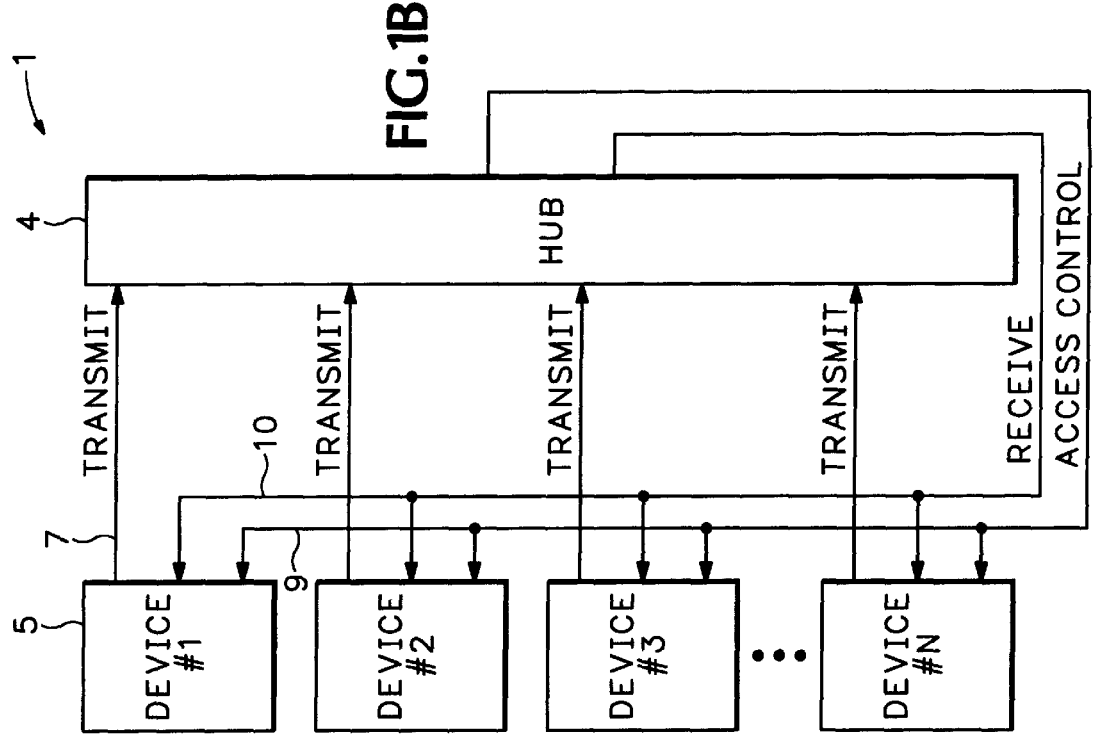
FIG. 1B is a block diagram of a lossless network with common receive and access control links according to another embodiment of the invention.
Figure 1A:
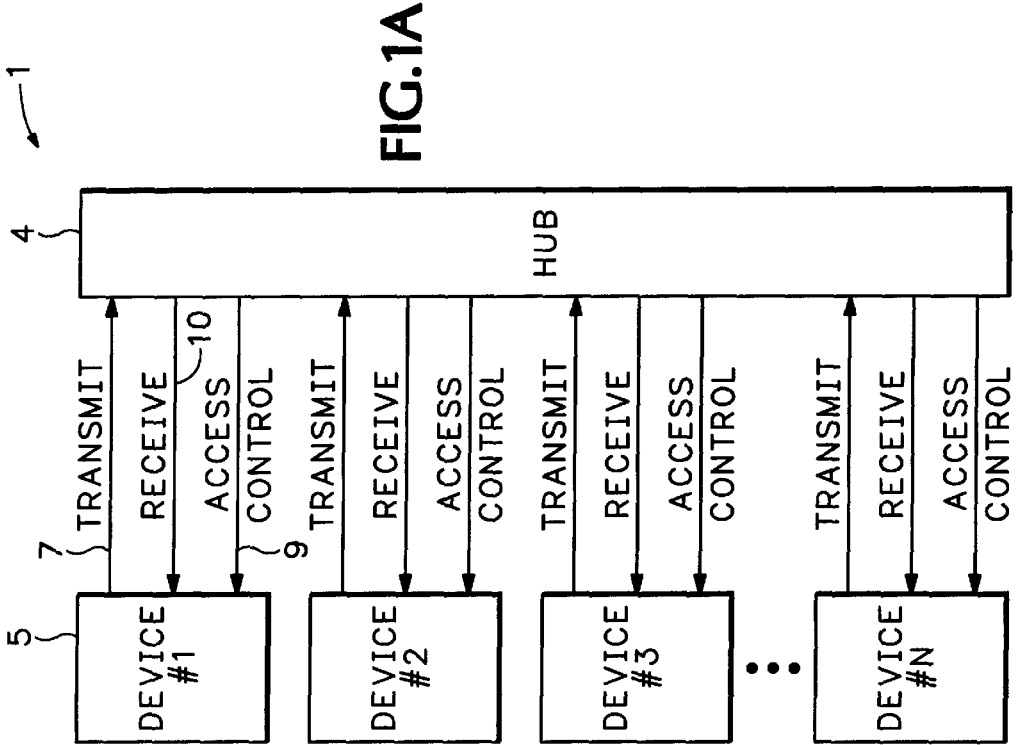
FIG. 1A is a block diagram of a lossless network according to one embodiment of the invention.

Referring to FIGS. 1A and 1B, a lossless network 1 according to the invention includes multiple devices 5 coupled to a hub 4 which contains an arbiter. Each device 5 is connected to the hub 4 through a private transmit link 7 and either a private receive link 10 and access control link 9, FIG. 1A, or a shared receive link 10 and access control link 9, FIG. 1B. The receive link 10, along with the transmit links 7, are used to send packets between devices 5. The access control signals 9 are required for the lossless arbitration. The devices 5 comprise systems, such as processing devices, storage devices, etc., that exchange information over the network.

With the exception of the out of band signals on access control link 9, the lossless network 1 in FIG. 1A appears like a standard CSMA/CD LAN, such as IEEE 802.3, that provides communication between devices 5. However, the lossless network 1 does not suffer bandwidth loss due to collisions, never experiences excessive collisions, and has greater short term access predictability than a standard CSMA/CD LAN.

The hub 4 uses a fixed priority scheme to determine which one of the devices 5 is allowed to continue to transmit when a collision occurs. The hub 4 drives the access control signals 9 that control the collision signals (CLSN) that notify the MAC 22 (FIG. 3) on each device 5 when a collision has occurred and that control the carrier sense signals (CRS) that the MAC on each device 5 uses to decide when to transmit.

The CLSN signal is not asserted to the device 5 winning the arbitration. Thus, the winning device 5 keeps transmitting. All other colliding devices 5 of lower priority are notified of the collision via the CLSN signal asserted through the access control signals 9. The losing devices 5 back off from transmitting for either zero or one slot times The CRS signal is then used by the hub 4 to control when each of the colliding devices 5 of lower priority are allowed to retransmit.

Figure 2A:
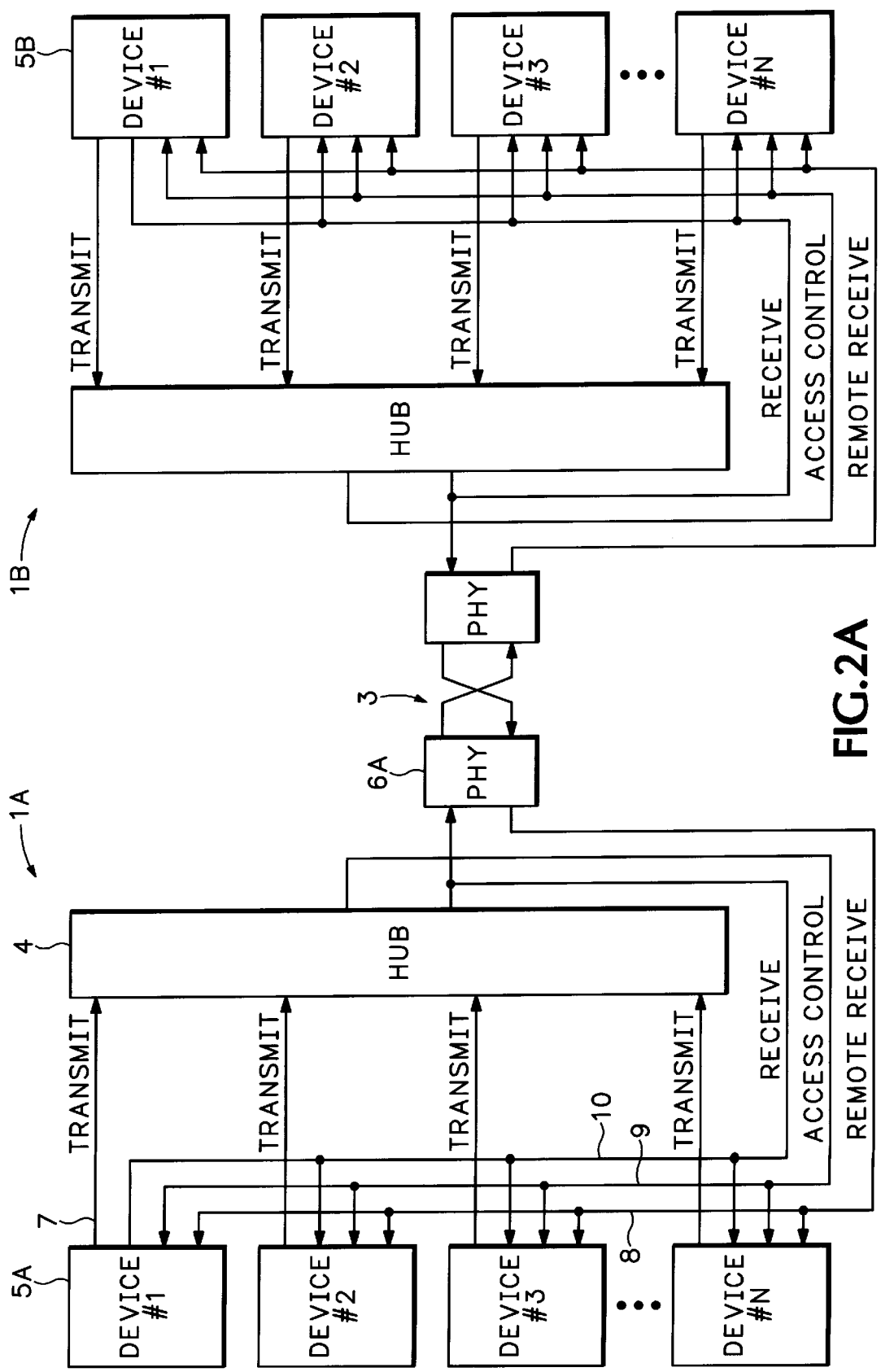
FIG. 2A is a block diagram of two lossless networks connected together by an IEEE 802.3 compliant full-duplex link according to another aspect of the invention.

FIG. 2A shows two lossless networks 1A and 1B in combination with an IEEE 802.3 compatible full-duplex link 3 that allows two groups of devices 5A and 5B whose physical separation is greater than that allowed by the IEEE 802.3 protocol to be interconnected without a switch or buffering. A second MAC (FIG. 3) is added to devices in each group to receive transmissions from devices in the other group.

Figure 2B:
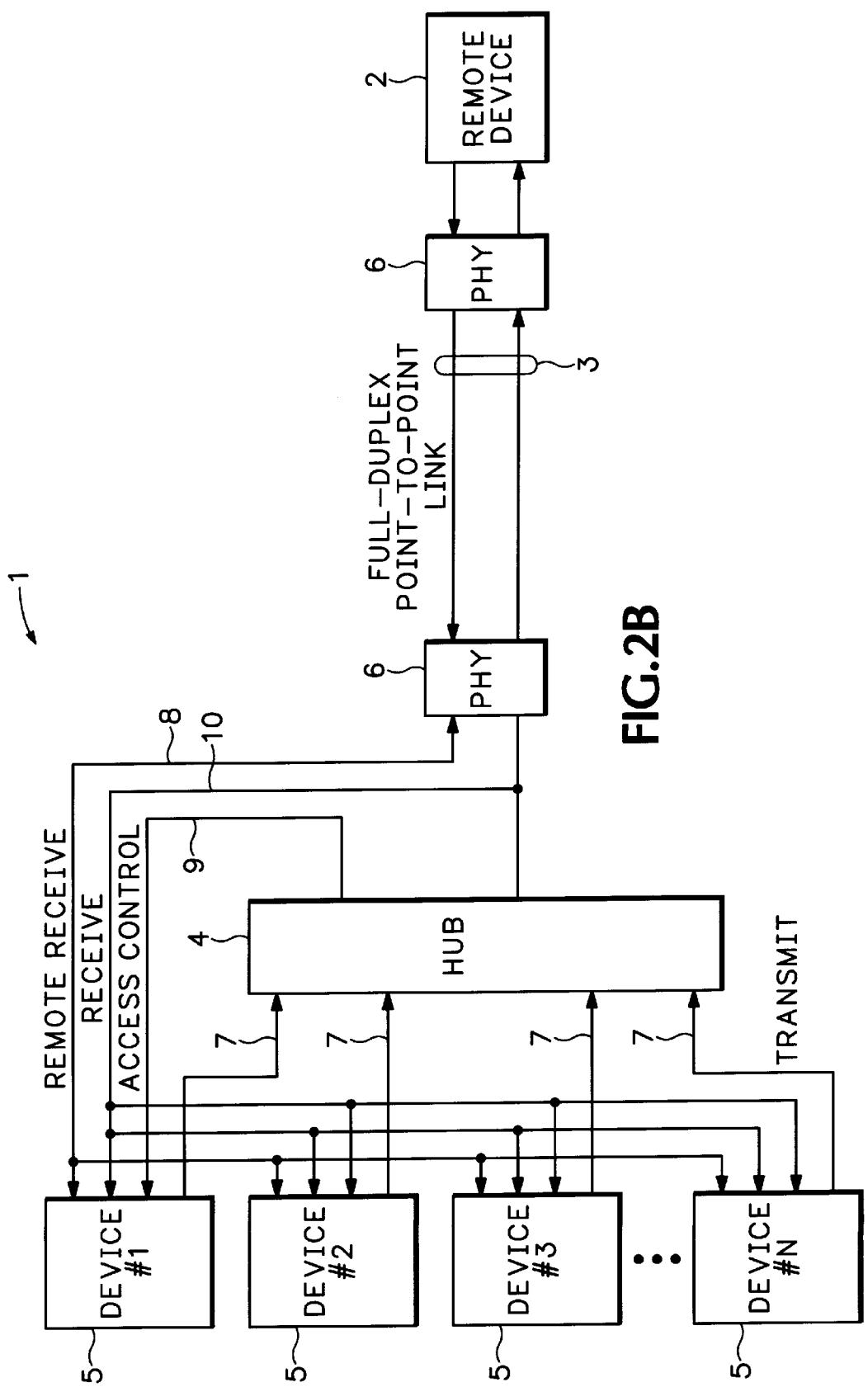
FIG. 2B is a block diagram of one lossless network connected to a single remote device by an IEEE 802.3 compliant full-duplex link according to yet another aspect of the invention.

FIG. 2B shows another embodiment of the invention in which one of the groups is degenerate and contains a single device 2. When a group consists of a single device 2, the MAC on the device can be connected directly to the full-duplex link 3 through a PHY 6.

In a third embodiment of the invention, each device 5 in FIGS. 2A and 2B contains a single MAC 22. Each device transmits to the hub through a transmit link 7, receives access control signals 9 from the hub and receives data from the remote network or device through remote receive link 8. There is no receive link 10 in this embodiment. Devices attached to one hub can communicate with devices connected to the other hub, but cannot communicate with devices connected to their hub.

The lossless network 1 allows aggregation of multiple devices 5 on one ell(I or both ends of the full-duplex IEEE 802.3 point-to-point link 3. The devices 5 are aggregated without having to use complex full-duplex switching circuitry or buffering. Due to the lossless arbitration scheme described in further detail below, the lossless network 1 also has increased usable bandwidth and is more predictable than existing CSMA/CD network protocols.

Roundtrip time is defined as the time from when any one of devices 5 begins to transmit to the time that a collision indication is received back from the hub 4. The lossless network 1 is spatially confined such that the roundtrip time is less than the time required for the device to complete transmitting a minimum sized packet. Thus, the devices 5 will not lose packets from delayed receipt of the collision signal. Because the lossless LAN is spatially constrained, the hub 4 is not required to buffer packets.

Figure 3:
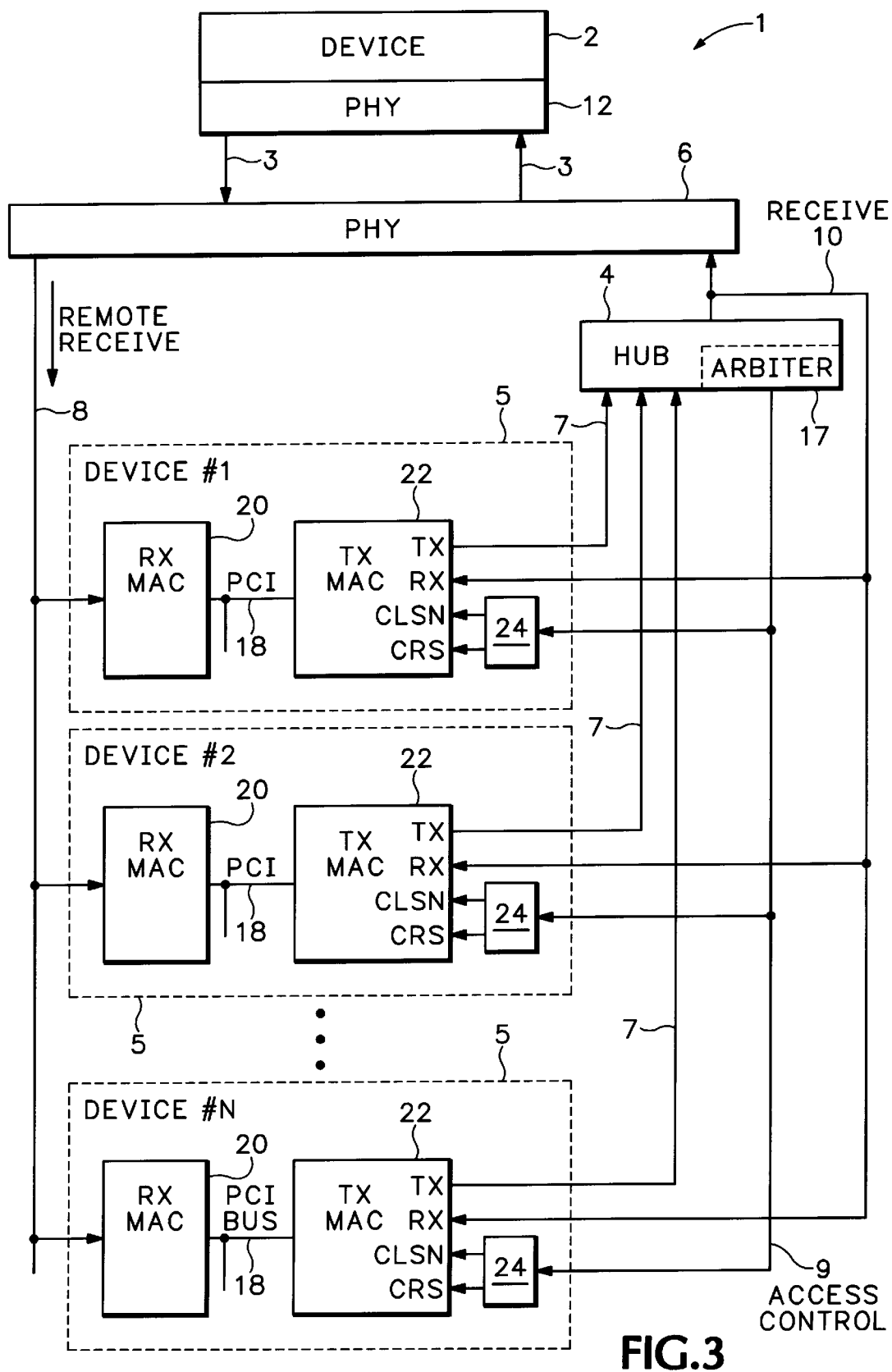
FIG. 3 is a detailed diagram for one embodiment of the lossless network.

FIG. 3 is a detailed diagram for one embodiment of the lossless network 1. Two independently operating CSMA/CD Media Access Controllers (MACs) 20 and 22 are shown in each device 5. The MAC 20 is refer-red to as a receive MAC (RX MAC) and the MAC 22 is refer-ed to as a transmit MAC (TX MAC). The receive MACs 20 can be excluded from each device when the lossless network 1 is not coupled to an external full-duplex link 3 or when receive link 10 is not implemented. The RX MAC 20 in each device 5 is coupled through the remote receive link 8 to full-duplex link 3. The TX MAC 22 in each device 5 is coupled through one of the transmit links 7 to the hub 4. The transmit links 7 are arranged in a star wired connection that separately connect each one of the TX MACs 22 to the hub 4. The star wired connections 7 allow every TX MAC 22 to transmit packets without corrupting packets transmitted by the other TX MACs 22. Thus, collisions do not result in corrupted packets and a faulty TX MAC on one device does not corrupt packets transmitted by TX MACs on other devices.

When packets are transmitted between devices 5 within the same lossless network 1, the TX MACs 22 transmit packets to the hub 4 over transmit links 7. The hub 4 then passes the packets back through the receive link 10 to a receive poll on each TX MAC 22. The packets on receive link 10 are received by all the TX MACs 22 but only the device 5 with the corresponding packet address processes the packet.

The systems shown in FIGS. 2A and 2B can transmit packets to devices outside lossless network 1. The hub 4 passes packets from the TX MAC 22 through PHY 6 and the lull-duplex link 3 to a remote network or device. In one embodiment, the remote network connected to the opposite end of the full-duplex link 3 comprises another lossless network 1 (FIG. 2A). Alternatively, the remote network is a single device 2 (FIG. 2B).

For packets received from the remote device 2, or from a second group of devices in another lossless network, packets are received from full-duplex link 3. Packets pass from PHY 6 over the remote receive link 8 to one of the RX MACs 20. The RX MACs 20 are dedicated to only receiving packets and transfer the packets to additional device Circuitry (not show). For example, the packets may be passed over a PCI bus 18 to a CPU DRAM (not shown). Because the RX MACs 20 only receive packets, there are no collisions on the remote receive link 8. Thus, any number of devices 5 can be connected to remote receive link 8 without using a arbiter.

The access control signals 9 are coupled to logic 24 in each device 5. The logic 24 uses the access control signals 9 to control the CLSN and CRS signals on each TX MAC 22. In an alternative embodiment, all of the TX MACs 22 are coupled to the same transmit link 7. A tri-state buffer (not shown) is coupled between each TX MAC 22 and the common transmit link 7. The logic 24 enables the tri-state buffer according to the access control signals 9. In another embodiment of the invention, instead of using common access control signals 9, common receive link 10 and local logic 24 in each device, separate CLSN and CRS lines and receive links 10 are coupled from the hub 4 directly to each TX MAC 22 (FIG. 1A).

Figure 4:
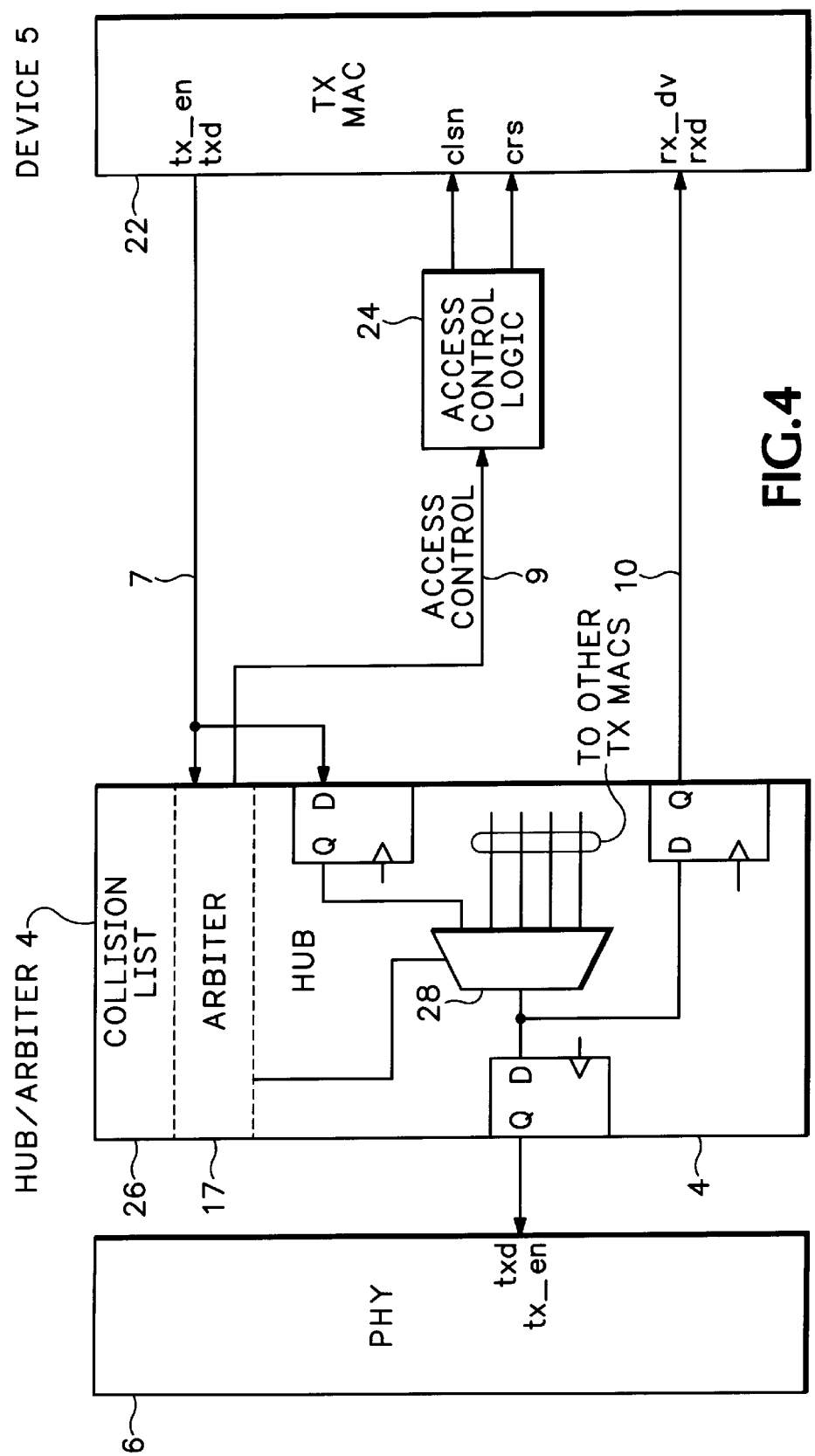
FIG. 4 is a detailed diagram showing connections between a hub and a medium access controller for the lossless network.

FIG. 4 is a detailed diagram showing MII interconnections between one of the TX MACs 22 and the hub/arbiter 4. Media Independent Interface (MII) is defined in IEEE 802.3u for 100 megabits/second IEEE 802.3 LANs. The MII interconnections include a transmit enable signal TX_EN and transmit data signals TXD sent on the transmit link 7 to the hub 4. Out of band access control signals are sent back from the hub 4 through the logic 24 to the TX MAC 22. The receive link 10 includes a receive data valid signal RX_DV and receive data signals RXD. The hub 4 includes a multiplexer (MUX) 28 having inputs separately coupled to each one of the TX MACs 22 by the transmit links 7 and an output coupled to both the PHY 6 and the receive link 10. The arbiter 17 uses a priority, that may be fixed, and a collision list 26 to determine which input of MUX 28 is enabled.

Out of Band Signaling

A novel out of band signaling protocol is used to prevent repeated collisions. The TX MACs 22 assert the TX_EN signal when transmitting valid packets via the TXD signals on their respective transmit link 7. The arbiter 17 checks the priorities when the TX_EN signal is asserted by multiple devices 5. The device 5 with the highest priority is allowed to continue to transmit packets through MUX 28 to the PHY 6 and to receive link 10. The arbiter 17 allows the highest priority device to continue transmitting by not asserting the CLSN signal to that one device 5. The arbiter 17 essentially hides the collision from the one device 5.

The CLSN/CRS logic 24 assets the CLSN signals to the losing devices 5 according to the access control signals 9. The colliding devices 5, other than the device with highest priority, then back off from transmitting. The logic 24 also activates the CRS signals on all devices 5 indicating another device is currently transmitting. The devices 5 that back off will not try to retransmit while the CRS signal is asserted. In a standard IEEE 802.3 protocol, the CRS signal is deasserted on every device when the LAN becomes idle. This opens up the possibility of multiple devices recolliding. However, the arbiter 17 in the current invention uses the CRS signal to pr-event the devices 5 from going into repeated back off states due to collisions. Controlling individual CLSN and CRS signals for each device 5 out of band allows the arbiter 17 to force the CSMA/CD devices to transmit in a sequential prioritized order.

Lossless Arbitration Scheme

Figure 5:
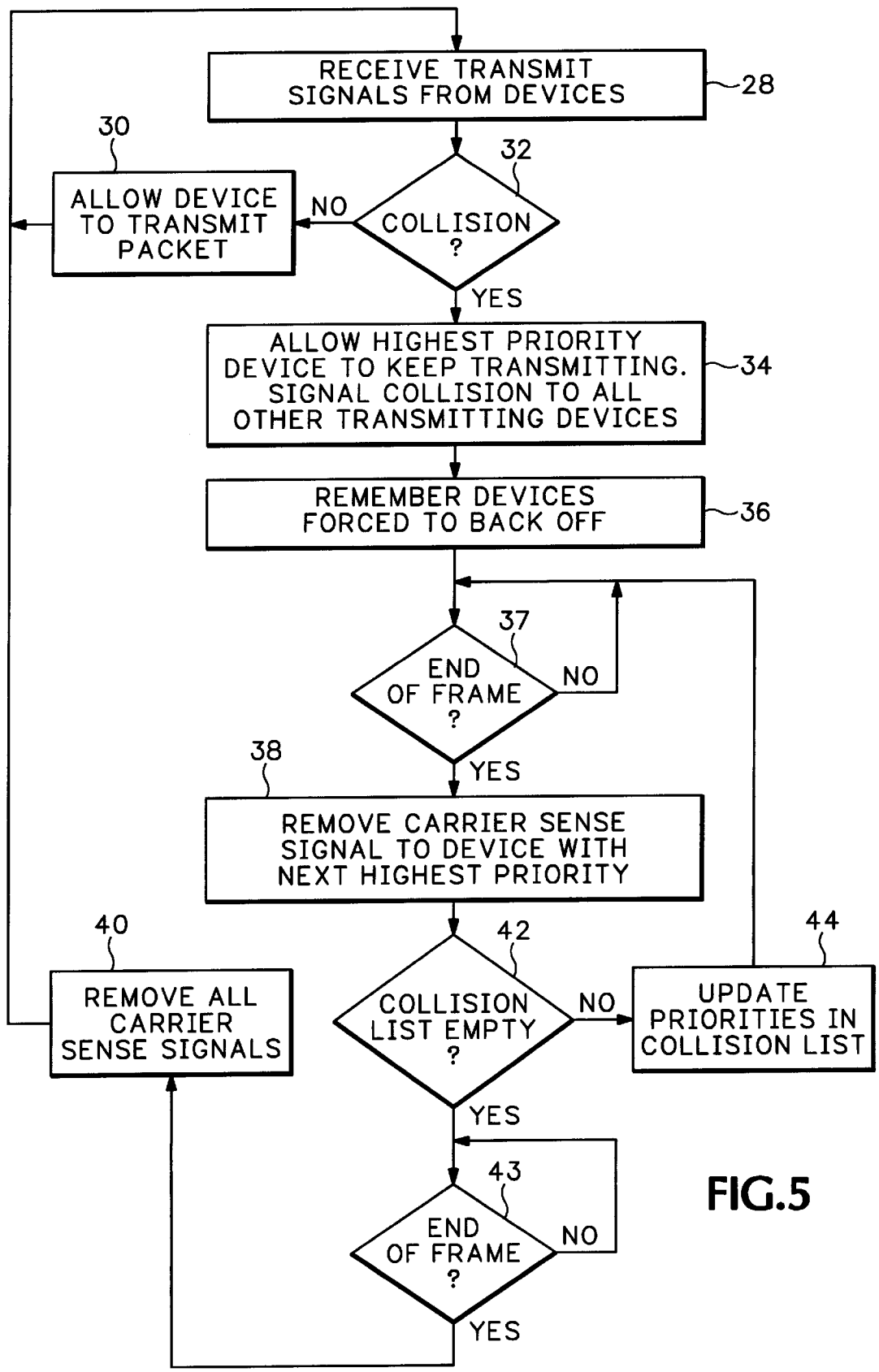
FIG. 5 is a flow diagram describing a lossless arbitration protocol for the lossless network.

Referring to FIG. 5, the lossless arbitration scheme is described in further detail. The priority for the devices can be fixed in any order depending on the importance of the device in quickly completing packet transmissions or it can be variable. For explanation purposes, the lossless arbitration scheme will be described with the first device#1 having highest priority, the second device#2 having second highest priority, and so on. It will also be assumed that device#1 through device#3 all attempt to transmit at about the same time.

The hub 4 receives transmit signals from each device 5 over the transmit links 7 in step 28. If there are no collisions detected in decision step 32, the transmitting device is allowed to transmit data through hub 4 back through receive link 10 and, if applicable, to the full-duplex link 3. If a collision is detected between two or more devices 5, the arbiter 17 allows the highest priority device to keep transmitting in step 34 by hiding the collision from device#1. The hub 4 signals a collision to all the other colliding devices by causing the assertion of their CLSN signals. The arbiter 17 in step 36 keeps a collision list 26 of the devices that collided and were forced to back off.

If all the devices 5 were on a conventional collision-based LAN, any collision would cause all transmitting devices to back off. Because each device 5 in the network 1 has a separate transmit link 7 to the hub 4, there is no chance that another device 5 will corrupt the data sent by device#1. Thus, the lossless network 1 saves bandwidth in yet another manner by allowing device#1 to continue to transmit without first going through any back off cycle.

When device#1 finishes transmitting as indicated by an end of frame in decision step 37, the arbiter 17 deasserts the carrier sense signal to the device in the collision list with the next highest priority (e.g., device#2) but keeps asserting the carrier sense signal to all tile other devices 5, including device#1. The CRS signal is deasserted for device#2 in step 38. The devices 5 will not retransmit while the CRS signal is asserted. Thus, all devices, other than device#2, are prevented from transmitting and as a result no collision will occur.

After receiving the CLSN signal, device#2 backs off either zero or one slot times. When the back off is zero slot times, device#2 completes the back off well before device#1 completes transmitting. When device#2 backs off one slot time, the back off time is longer but still within the time required for device# 1 to transmit one minimum size packet. Specifically, one slot time is equivalent to transmitting 64 bytes of data and the minimum packet is 64 bytes. Thus, device#2 is usually ready to transmit as soon as device#1 completes transmitting.

If device#2 does not respond after being enabled to transmit (deassertion of CRS), the CRS signal is reasserted to device#2 and the device 5 with the next highest priority is allowed to transmit by deasserting the CRS signal to clevice#3.

Decision step 42 moves sequentially down the collision list, deasserting the CRS signal one by one from each colliding device 5. After completion of a transmission, the priorities in the collision list are updated in step 44. Devices, other than the original 3 colliding devices, will not be able to transient until the arbiter 17 processes all devices in the collision list. When the last device 5 in the collision list has completed transmitting as indicated by an end of frame in decision step 43, the arbiter 17 deasserts the CRS signal to all the devices 5 in network 1 in step 40 and returns to step 28. Transmission is then reopened to any device 5 and, if necessary, a new collision list is created.

The devices 5 will never collide more than once for each packet the device transmits. Even when there is a collision, one device 5 is allowed to continue to transmit. Once there is a collision, the devices are forced to transmit in an ordered priority. As a result, there are no lost bus cycles due to repeated back offs from collisions. Further, the arbitration scheme is more predictable than standard CSMA/CD protocols. Because the lossless network looks to attached devices 5 as a conventional CSMA/CD LAN, standard communication circuitry such as IEEE 802.3 compliant MACS can be used in the devices 5.

Figure 6:
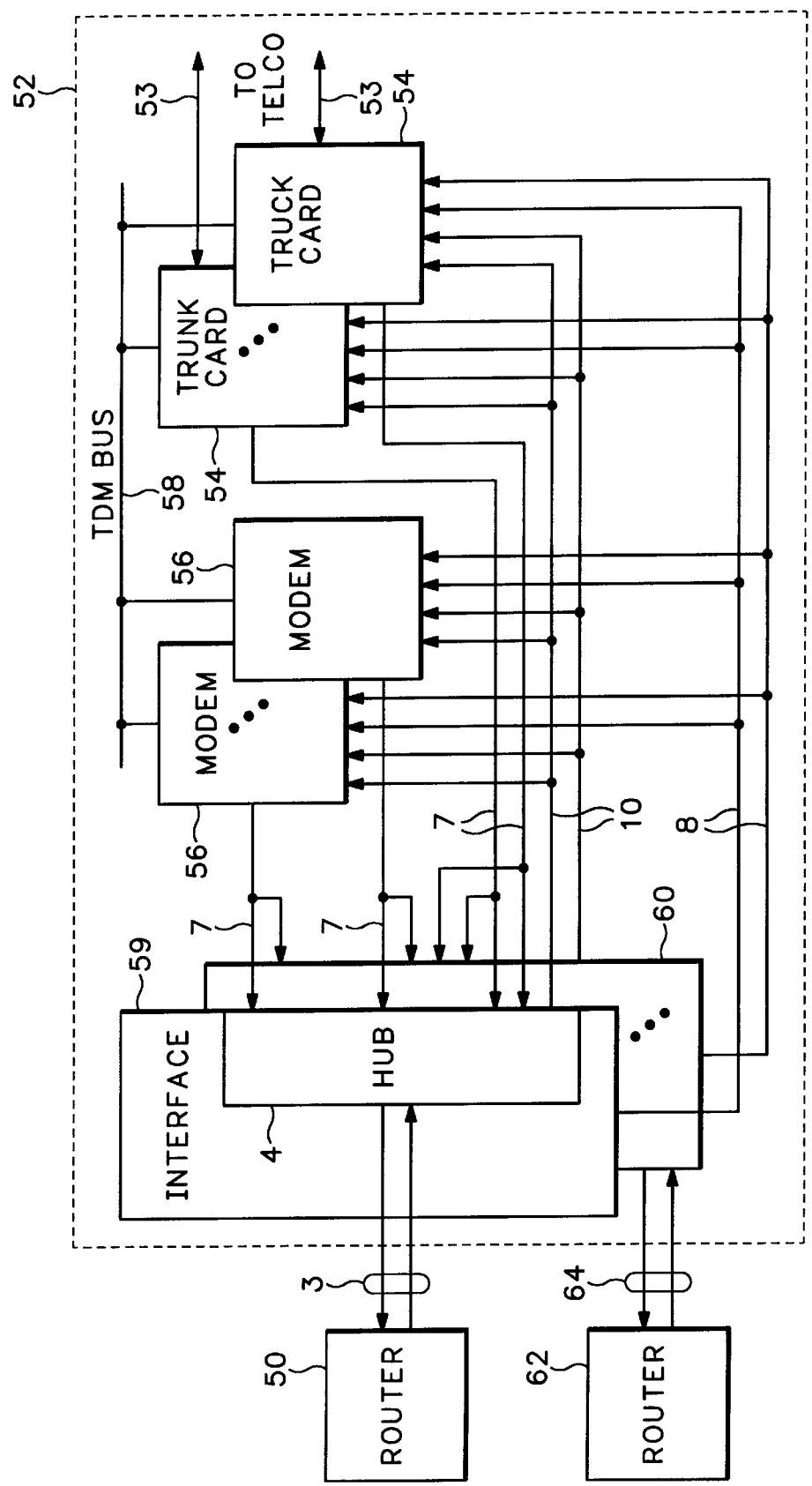
FIG. 6 is block diagram of a system for processing telephone signals according to yet another embodiment of the invention.

Another embodiment of the invention is shown to FIG. 6. A full-duplex IEEE 802.3 point-to-point link 3 is used to pass digital packets between a router 50 and devices in a lossless network 52. Data is transmitted from a telephone company central office (not shown) over telephone lines 53 which are typically cT1 lines or cT3 lines. Data is transmitted on the telephone lines 53 either as ISDN signals or digitized analog modem signals.

The lossless network 52 has one of more trunk cards 54 coupled to the telephone lines 53. The trunk cards 54 are coupled to modem cards 56 over a Time Division Multiplexed (TDM) bus 58. The trunk cards 54 and modem cards 56 are each separately coupled to the hub 4 on an interface card 59 by transmit links 7. A receive link 10 is coupled between the output of hub 4 and MACs in each modem card 56 and trunk card 54. A remote receive link 8 is coupled between the interface 59 and each modem card 56 and trunk card 54.

Packets sent over the transmit links 7 to hub 4 can be transmitted back to any one of the modem cards 56 or trunk cards 54 through the receive link 10. Packets sent to router 50 are transmitted by one of the modem cards 56 of trunk cards 54 over the transmit link 7 and through hub 4 to full-duplex link 3. Packets transmitted from router 50 over full-duplex link 3 are received by the modem cards 56 and trunk cards 54 over remote receive link 8.

The trunk card circuitry, modem card circuitry, and other interface circuitry, other than the new lossless network architecture, is known to those skilled in the art and is therefore not described in further detail.

For redundancy purposes, a second interface card 60 is incorporated into the lossless network 52. The second interface card 60 is coupled to the router 50 by a separate full-duplex link 64 or coupled to a second router 62 by the full-duplex link 64. The second interface card 60 includes a separate hub (not shown) coupled to the same transmit links 7 coupled to interface card 59. A second receive link 10 is coupled between the hub in interface card 60 and each modem card 56 and trunk card 54. A second remote receive link 8 arc coupled between the interface card 60 and each modem card 56 and trunk card 54.

Incorporating the lossless network architecture 52 allows aggregation of multiple modem cards 56 and trunk cards 54 using only the simple hub 4 and standard 802.3 compliant communication circuitry.

Having described and illustrated the principles ol the invention in a preferred embodiment thereof, it should be apparent that the invention can be modified in arrangement and detail without departing from such principles. I claim all modifications and variation coning within the spirit and scope of the following claims.

What is claimed is:

1. A lossless network processing device, comprising;
a first CSMA/CD controller located in a first device, the first CSMA/CD controller having an output for coupling to an input of a hub and an input for coupling directly to an output of the hub, the output of the hub also coupled to inputs of other devices different from the first device, the output of the first CSMA/CD controller transmitting a first set of packets through the hub to any one of the other devices, the input of the first CSMA/CD controller receiving a second set of packets from the hub output of the hub;

a second CSMA/CD controller in the first device having an input coupled to a physical interface (PHY) and capable of receiving a third set of packets through the physical interface at the same time that the first CSMA/CD controller receives the second set of packets from the hub; and an arbiter that detects a collision condition where some of the devices are colliding devices, the arbiter hiding that collision condition from a first one of the colliding devices to prevent the first one of the colliding devices from having to retransmit packets after the collision condition, the arbiter maintaining a collision list for preventing the devices that are not colliding devices during the collision condition from requesting packet transmission until all the colliding devices finish transmitting one at a time in a sequential manner.

2. A lossless network processing device, comprising:
a first CSMA/CD controller located in a first device, the first CSMA/CD controller having an output for coupling to an input of a hub and an input for coupling directly to an output of the hub, the output of the hub also coupled to inputs of other devices different from the first device, the output of the first CSMA/CD controller transmitting a first set of packets through the hub to any one of the other devices and the input of the first CSMA/CD controller receiving a second set of packets from the hub output;

a second CSMA/CD controller in the first device having an input coupled to a physical interface (PHY) and capable of receiving a third set of packets through the physical interface at the same time that the first CSMA/CD controller receives the second set of packets from the hub, wherein the input on the second CSMA/CD controller is coupled to a first half of a full duplex link and an opposite end of the full duplex link is coupled to an output of an external system;

the other devices comprising a first group of devices each having a first CSMA/CD controller coupled to the hub and a second CSMA/CD controller coupled by the first half of the full-duplex link to the external system, the external system including the following:

a second group of devices each having first and second media access controllers (MACs); and a second hub receiving packets transmitted from the first MACs in the second group of devices and coupled by the first half of the full-duplex link to the second CSMA/CD controllers on the first group of devices.

3. A lossless network processing device, comprising:
a first CSMA/CD controller located in a first device, the first CSMA/CD controller having an output for coupling to an input of a hub and an input for coupling directly to an output of the hub, the output of the hub also coupled to inputs of other devices different from the first device, the output of the first CSMA/CD controller transmitting a first set of packets through the hub to any one of the other devices and the input of the first CSMA/CD controller receiving a second set of packets from the hub output;

a second CSMA/CD controller in the first device having an input coupled to a physical interface (PHY) and capable of receiving a third set of packets through the physical interface at the same time that the first CSMA/CD controller receives the second set of packets from the hub; and access control signal connections coupled between the hub and the first CSMA/CD controller for controlling when the first CSMA/CD controller transmits packets, the access control signal connections independent of a data connection used by the first CSMA/CD controller to transmit the first set of packets.

4. A network processing device according to claim 3 including a decoder coupled between the hub and the first CSMA/CD controller, the decoder converting the access control signal connections into an IEEE 802.3 compliant collision indication signal that forces the first CSMA/CD controller to back off when transmitting, the decoder also converting the access control signal connections into an IEEE 802.3 compliant carrier sense signal that prevents the CSMA/CD controller from attempting to retransmit until the carrier sense signal is deasserted.

5. A method for managing contentions with a hub between multiple devices on a CSMA/CD based network, comprising:

receiving at the hub transmissions of packets from media access controllers (MACs) in the multiple devices;

detecting a collision condition at the hub where two or more of the multiple devices identified as colliding devices attempt to transmit packets at the same time;

hiding the collision condition from the MAC in a first one of the colliding devices while notifying the MACs in the other colliding devices of the collision condition thereby causing the first one of the colliding devices to continue transmitting packets while forcing the other colliding devices into a continuous back off condition that prevents the MACs in the colliding devices from ever recolliding; and sequentially enabling the remaining colliding devices to retransmit one at a time only after a preceding one of the colliding devices completes transmitting while at the same time preventing any noncolliding devices from requesting packet transmission until the remaining colliding devices have completed transmission.

6. A method according to claim 5 including:

selecting a first one of the colliding devices having highest priority of the colliding devices to transmit;

selecting a second colliding device having second highest priority of the colliding devices to retransmit after the first device completes transmitting;

preventing the remaining devices from retransmitting thereby preventing the remaining devices from repeated back offs due to collisions; and updating priority after the first device completes transmitting by moving each one of the remaining colliding devices to a next higher priority.

7. A method according to claim 6 wherein notifying the devices of the collision condition comprises asserting a collision signal to all of the colliding devices except the first device.

8. A method according to claim 6 wherein enabling the second device comprises deasserting a carrier sense signal to the second device while continuing to assert the carrier sense signal to the remaining devices.

9. A method according to claim 5 wherein each one of the devices includes a first IEEE 802.3 compliant MAC coupled directly to the hub, the hub feeding the packets directly back to the MAC in one of the devices when the packets have addresses associated with one of the devices and wherein each one of the devices includes a second IEEE 802.3 compliant MAC that is able to receive remote packets through a physical interface at the same time the first MAC receives packets from the hub.

10. A method according to claim 9 including:

receiving separate transmissions from each one of the MACs;

selecting one of the MACs for transmitting data on the transmit link; and sending back the data from the selected MAC to each one of the MACs on a receive link.

11. A hub for handling transmissions from multiple local devices, comprising:

a first interface for coupling to outputs from IEEE 802.3 compliant media access controllers (MACs), the MACs located in local devices;

an out of band access control link interface independent of the first interface for coupling to each one of the MACs, the access control link interface individually controlling when each one of the MACs transmit packets from the outputs;

a second interface for coupling to receive inputs on the MACs in the local devices for looping back the transmission of packets directly from the second interface on the hub to the receive inputs on the MACs in the local devices the second interface coupling to one half of a full-duplex link for transmitting the packets to a remote system; and an arbiter for detecting a collision condition where at least some of the local devices are identified as colliding devices the arbiter controlling packet transmissions by hiding the collision condition from a first one of the colliding devices allowing the first one of the colliding devices to continue to transmit packets while preventing noncolliding devices from requesting packet transmission until all of the colliding devices are sequentially enabled to retransmit one at a time only after a preceding one of the colliding devices completes transmitting.

12. A hub for handling transmissions from multiple devices, comprising:

multiple first interfaces for individually coupling to outputs from associated media access controllers (MACs) in each of the multiple devices;

a second interface for coupling to receive inputs on the MACs in the multiple devices;

an out of band access control link interface separate from the first interfaces and the second interface for coupling to each one of the MACs, the access control link interface individually controlling when each one of the MACs transmit; and an arbiter for controlling transmissions through the out of band access control link interface for a collision condition between any of the multiple devices, the arbiter hiding the collision condition from a first one of the multiple devices allowing that first one of the multiple devices to continue to transmit during that collision condition, the arbiter then enabling any other of the multiple devices in the collision condition to retransmit one at a time only after the first one of the devices completes transmitting while at the same time preventing any of the devices not in the collision condition from requesting packet transmission until the devices in the collision condition complete transmitting.

13. A hub according to claim 12 including first and second MACs in each one of the devices and a first receive link coupled between the hub second interface and the receive inputs in the first MACs and a second receive link coupled between an external physical interface and a receive input in each of the second MACs.

14. A hub according to claim 12 including a remote system comprising:
   a centralized hub coupled by a transmit link to each one of a second group of devices having IEEE 802.3 compliant MACs;
   an access control link coupled between the centralized hub and each one of the MACS in the second group of devices, the access control link individually controlling when each one of the MACS in the second group of devices transmit; and
   a receive link coupled to the MACs in the second group of devices for receiving packets.

15. Software stored on a computer readable medium for managing contentions between multiple devices on a CSMA/CD based network, comprising:
   code for identifying packets transmitted from media access controllers (MACs) in the multiple devices;
   code for detecting a collision condition when some of the multiple devices identified as colliding devices request transmission at the same time;
   code for hiding the collision condition from the MAC in a first one of the colliding devices preventing that first one of the colliding devices from having to rerequest a packet transmit after the collision condition;
   code for preventing the colliding devices from recolliding by holding the colliding devices other than the first one of the colliding devices in a continuous backoff state and then sequentially enabling the colliding devices to retransmit one at a time only after the first one of the devices completes transmitting; and
   code for preventing any of the multiple devices that are not colliding devices from requesting transmission until the colliding devices have completed transmission.

16. Software according to claim 15 including code for feeding the packets directly back from a hub to the MAC in one of the devices when the packets have an address associated with that one of the devices.

17. Software according to claim 15 including code for asserting a collision signal to all of the colliding devices except the first one of the colliding devices.

18. Software according to claim 17 including code that prevents any of the colliding devices from recolliding after the collision condition by continuously asserting a carrier sense signal to all of the colliding and noncolliding devices.

19. Software according to claim 18 including code that enables a second one of the colliding devices to transmit packets by deasserting the carrier sense signal to the second one of the devices while asserting the carrier sense signal to all of the colliding and noncolliding multiple devices expect the second one of the colliding devices.

20. Apparatus for managing contentions between multiple devices on a CSMA/CD based network, comprising:
   means for identifying packets transmitted from media access controllers (MACs) in the multiple devices;
   means for detecting a collision condition when some of the multiple devices identified as colliding devices request transmission at the same time;
   means for hiding the collision condition from the MAC in a first one of the colliding devices preventing that first one of the colliding devices from having to retransmit after the collision condition;
   means for preventing the colliding devices from recolliding by holding the colliding devices other than the first one of the colliding devices in a continuous backoff state and then sequentially enabling the colliding devices held in the backoff state to retransmit one at a time only after the first one of the colliding devices completes transmitting; and
   means for preventing any noncolliding devices from requesting transmission until the colliding devices have completed transmission.

* * * * *

UNITED STATES PATENT AND TRADEMARK OFFICE
CERTIFICATE OF CORRECTION

PATENT NO. : 6,181,708 B1
DATED : January 30, 2001
INVENTOR(S) : Quackenbush et al.

It is certified that error appears in the above-identified patent and that said Letters Patent is hereby corrected as shown below:

Column 1,
Line 38, "collisions ale discarded" should read -- collisions are discarded --

Column 2,
Line 33, "not pall of" should read -- not part of --

Column 4,
Line 14, "one ell(I or" should read -- one end or --
Line 34, "is refer-red to" should read -- is referred to --
Line 35, "is refer-ed to" should read -- is referred to --
Line 54, "receive poll on" should read -- receive port on --
Line 61, "lull-duplex link" should read -- full-duplex link --

Column 5,
Line 5, "show)" should read -- shown) --
Line 49, "24 assets the" should read -- 24 asserts the --
Line 60, "pr-event" should read -- prevent --

Column 6,
Line 33, "all tile other" should read -- all the other --
Line 53, "clevice#3" should read -- device#3 --
Line 59, "to transient until" should read -- to transmit until --

UNITED STATES PATENT AND TRADEMARK OFFICE
CERTIFICATE OF CORRECTION

PATENT NO. : 6,181,708 B1
DATED : January 30, 2001
INVENTOR(S) : Quackenbush et al.

It is certified that error appears in the above-identified patent and that said Letters Patent is hereby corrected as shown below:

Column 7,
Line 10, "shown to FIG." should read -- shown in FIG. --
Line 49, "8 arc coupled" should read -- 8 are coupled --
Line 52, "multiple modern cards" should read -- multiple modem cards --
Line 55, "principles ol the" should read -- principles of the --
Line 59, "variation coning within" should read -- variation coming within --

Column 12,
Line 16, "devices expect" should read -- devices except --

Signed and Sealed this

Twenty-sixth Day of March, 2002

Attest:

Attesting Officer

JAMES E. ROGAN
*Director of the United States Patent and Trademark Office*